United States Patent
Sewall et al.

(10) Patent No.: US 9,021,081 B2
(45) Date of Patent: Apr. 28, 2015

(54) SYSTEM AND METHOD FOR COLLECTING INDIVIDUALIZED NETWORK USAGE DATA IN A PERSONAL HOTSPOT WIRELESS NETWORK

(75) Inventors: Patrick Sewall, Boise, ID (US); David Alan Johnson, Boise, ID (US)

(73) Assignee: Cradlepoint, Inc., Boise, ID (US)

( * ) Notice: Subject to any disclaimer, the term of this patent is extended or adjusted under 35 U.S.C. 154(b) by 397 days.

(21) Appl. No.: 12/172,885

(22) Filed: Jul. 14, 2008

(65) Prior Publication Data
US 2008/0313327 A1    Dec. 18, 2008

Related U.S. Application Data

(63) Continuation-in-part of application No. 11/673,956, filed on Feb. 12, 2007.

(60) Provisional application No. 60/950,629, filed on Jul. 19, 2007.

(51) Int. Cl.
| | |
|---|---|
| *G06F 15/173* | (2006.01) |
| *H04L 12/28* | (2006.01) |
| *H04W 88/10* | (2009.01) |
| *H04L 12/26* | (2006.01) |
| *H04L 29/08* | (2006.01) |

(52) U.S. Cl.
CPC ............. *H04L 12/287* (2013.01); *H04W 88/10* (2013.01); *H04L 43/0888* (2013.01); *H04L 67/22* (2013.01)

(58) Field of Classification Search
CPC .................................................... H04W 88/10
USPC ........ 709/223–225, 238; 707/3, 7; 455/412.1, 455/512; 370/250, 252, 230, 338, 401, 412, 370/431, 465
See application file for complete search history.

(56) References Cited

U.S. PATENT DOCUMENTS

| | | | |
|---|---|---|---|
| 5,231,633 | A | 7/1993 | Hluchyj et al. |
| 5,594,946 | A | 1/1997 | Menich et al. |
| 5,638,359 | A | 6/1997 | Peltola et al. |
| 5,859,628 | A | 1/1999 | Ross et al. |
| 5,864,539 | A | 1/1999 | Yin |
| 6,006,034 | A | 12/1999 | Heath et al. |

(Continued)

FOREIGN PATENT DOCUMENTS

EP    1331784 A1    7/2003

OTHER PUBLICATIONS

"In Motion Technology, Inc. Introduces Industry's First 3G Hotspot for Passenger Productivity." In Motion Technology—Take Your Business on the Road—Mobile Hotspot. Jul. 31, 2003. Web. <http://www.inmotiontechnology.com/newsevents/carey.html>.*

(Continued)

*Primary Examiner* — Imad Hussain
(74) *Attorney, Agent, or Firm* — Parsons Behle & Latimer (57) ABSTRACT

A method for collecting individualized network usage data includes routing Internet communications between a plurality of local clients and a plurality of remote servers over a common data link between a router device and the Internet. For each of the plurality of clients, characteristics of that client's communications routed over the data link are monitored at the router device. A collection of statistics reflecting the monitored characteristics are maintained. From the router device, the collection of statistics are periodically communicated over the data link to an interested server.

23 Claims, 5 Drawing Sheets

(56) References Cited

U.S. PATENT DOCUMENTS

| | | | |
|---|---|---|---|
| 6,006,264 A | 12/1999 | Colby et al. | |
| 6,028,848 A | 2/2000 | Bhatia et al. | |
| 6,031,844 A * | 2/2000 | Lin | 370/431 |
| 6,377,825 B1 | 4/2002 | Kennedy et al. | |
| 6,389,462 B1 | 5/2002 | Cohen et al. | |
| 6,434,187 B1 | 8/2002 | Beard et al. | |
| 6,535,592 B1 | 3/2003 | Snelgrove | |
| 6,553,028 B1 | 4/2003 | Tang | |
| 6,560,442 B1 | 5/2003 | Yost et al. | |
| 6,609,197 B1 | 8/2003 | Ketcham et al. | |
| 6,611,861 B1 | 8/2003 | Schairer et al. | |
| 6,615,262 B2 * | 9/2003 | Schweitzer et al. | 709/224 |
| 6,735,447 B1 | 5/2004 | Muller | |
| 6,795,700 B2 * | 9/2004 | Karaoguz et al. | 455/408 |
| 6,850,495 B1 | 2/2005 | Baum et al. | |
| 6,862,444 B2 * | 3/2005 | Karaoguz et al. | 455/408 |
| 6,885,859 B2 * | 4/2005 | Karaoguz et al. | 455/408 |
| 6,967,958 B2 * | 11/2005 | Ono et al. | 370/401 |
| 6,987,726 B1 | 1/2006 | Elliott | |
| 7,009,941 B1 | 3/2006 | Uchino | |
| 7,095,335 B2 | 8/2006 | De Bolster et al. | |
| 7,187,923 B2 | 3/2007 | Mousseau et al. | |
| 7,213,478 B2 | 5/2007 | Harada et al. | |
| 7,317,896 B1 | 1/2008 | Saxena et al. | |
| 7,346,344 B2 | 3/2008 | Fontaine | |
| 7,382,771 B2 | 6/2008 | Leblanc et al. | |
| 7,400,903 B2 | 7/2008 | Shoemake et al. | |
| 7,421,265 B1 | 9/2008 | Liu | |
| 7,558,199 B1 | 7/2009 | Minei | |
| 7,617,317 B2 | 11/2009 | Jones et al. | |
| 7,620,065 B2 * | 11/2009 | Falardeau | 370/465 |
| 7,675,862 B2 | 3/2010 | Pham et al. | |
| 7,734,293 B2 * | 6/2010 | Zilliacus et al. | 455/445 |
| 7,764,784 B2 | 7/2010 | Sewall | |
| 7,813,314 B2 | 10/2010 | Fulknier et al. | |
| 8,046,000 B2 | 10/2011 | Sylvain | |
| 8,077,681 B2 | 12/2011 | Ahmavaara | |
| 8,090,807 B2 | 1/2012 | Chung et al. | |
| 8,126,145 B1 | 2/2012 | Tewari et al. | |
| 2001/0039580 A1 * | 11/2001 | Walker et al. | 709/224 |
| 2001/0042215 A1 | 11/2001 | Sullivan et al. | |
| 2001/0046870 A1 | 11/2001 | Stilp et al. | |
| 2001/0048683 A1 | 12/2001 | Allen | |
| 2002/0025832 A1 | 2/2002 | Durian et al. | |
| 2002/0062372 A1 | 5/2002 | Hong et al. | |
| 2002/0118663 A1 | 8/2002 | Dorenbosch et al. | |
| 2003/0037165 A1 * | 2/2003 | Shinomiya | 709/238 |
| 2003/0043755 A1 * | 3/2003 | Mitchell | 370/252 |
| 2003/0045295 A1 | 3/2003 | Stanforth | |
| 2003/0046396 A1 * | 3/2003 | Richter et al. | 709/226 |
| 2003/0051041 A1 * | 3/2003 | Kalavade et al. | 709/229 |
| 2003/0059005 A1 | 3/2003 | Meyerson et al. | |
| 2003/0126252 A1 | 7/2003 | Abir | |
| 2003/0200308 A1 * | 10/2003 | Tameda et al. | 709/224 |
| 2003/0212800 A1 | 11/2003 | Jones et al. | |
| 2003/0235175 A1 | 12/2003 | Naghian et al. | |
| 2004/0003071 A1 | 1/2004 | Mathew et al. | |
| 2004/0038697 A1 | 2/2004 | Attar et al. | |
| 2004/0049576 A1 * | 3/2004 | Schweitzer et al. | 709/224 |
| 2004/0068502 A1 | 4/2004 | Vogedes | |
| 2004/0073672 A1 * | 4/2004 | Fascenda | 709/225 |
| 2004/0087304 A1 * | 5/2004 | Buddhikot et al. | 455/426.2 |
| 2004/0110544 A1 | 6/2004 | Oyagi et al. | |
| 2004/0133689 A1 | 7/2004 | Vasisht | |
| 2004/0133793 A1 | 7/2004 | Ginter et al. | |
| 2004/0139170 A1 | 7/2004 | Shen et al. | |
| 2004/0152449 A1 * | 8/2004 | Koshihara | 455/412.1 |
| 2004/0153676 A1 | 8/2004 | Krantz et al. | |
| 2004/0185876 A1 * | 9/2004 | Groenendaal et al. | 455/456.5 |
| 2004/0205154 A1 | 10/2004 | Dalton et al. | |
| 2004/0205155 A1 | 10/2004 | Nobakht et al. | |
| 2004/0218544 A1 | 11/2004 | Lee | |
| 2004/0250136 A1 | 12/2004 | Albertine Trappeniers et al. | |
| 2005/0008017 A1 | 1/2005 | Datta et al. | |
| 2005/0014525 A1 * | 1/2005 | Tsunehara et al. | 455/525 |
| 2005/0022013 A1 | 1/2005 | Schwenk | |
| 2005/0038905 A1 | 2/2005 | Banes et al. | |
| 2005/0086346 A1 | 4/2005 | Meyer | |
| 2005/0101340 A1 | 5/2005 | Archiable | |
| 2005/0102529 A1 * | 5/2005 | Buddhikot et al. | 713/200 |
| 2005/0108573 A1 * | 5/2005 | Bennett et al. | 713/201 |
| 2005/0198234 A1 | 9/2005 | Leib et al. | |
| 2005/0198319 A1 | 9/2005 | Chan et al. | |
| 2005/0221850 A1 * | 10/2005 | Kashiwase | 455/512 |
| 2005/0233728 A1 | 10/2005 | Karaoguz et al. | |
| 2005/0245233 A1 | 11/2005 | Anderson | |
| 2005/0246434 A1 * | 11/2005 | Bantz et al. | 709/223 |
| 2005/0259645 A1 | 11/2005 | Chen et al. | |
| 2005/0259654 A1 | 11/2005 | Faulk | |
| 2005/0262248 A1 | 11/2005 | Jennings, III et al. | |
| 2005/0267965 A1 * | 12/2005 | Heller | 709/224 |
| 2006/0013235 A1 * | 1/2006 | Farnham | 370/401 |
| 2006/0047823 A1 | 3/2006 | Cheng | |
| 2006/0053290 A1 | 3/2006 | Randle | |
| 2006/0072474 A1 * | 4/2006 | Mitchell | 370/252 |
| 2006/0077607 A1 * | 4/2006 | Henricks et al. | 361/93.1 |
| 2006/0133582 A1 * | 6/2006 | McCulloch | 379/45 |
| 2006/0153216 A1 * | 7/2006 | Hosein et al. | 370/412 |
| 2006/0171402 A1 | 8/2006 | Moore et al. | |
| 2006/0184670 A1 * | 8/2006 | Beeson et al. | 709/224 |
| 2006/0187890 A1 | 8/2006 | Lin | |
| 2007/0002846 A1 | 1/2007 | Rada et al. | |
| 2007/0030857 A1 | 2/2007 | Fulknier et al. | |
| 2007/0081469 A1 * | 4/2007 | Tracy et al. | 370/252 |
| 2007/0083606 A1 | 4/2007 | Malik et al. | |
| 2007/0121839 A1 * | 5/2007 | Karaoguz et al. | 379/114.1 |
| 2007/0147324 A1 * | 6/2007 | McGary | 370/338 |
| 2007/0153689 A1 * | 7/2007 | Strub et al. | 370/230 |
| 2007/0177555 A1 | 8/2007 | Brueck | |
| 2007/0208864 A1 * | 9/2007 | Flynn et al. | 709/227 |
| 2007/0233879 A1 | 10/2007 | Woods et al. | |
| 2007/0254727 A1 | 11/2007 | Sewall et al. | |
| 2007/0255848 A1 | 11/2007 | Sewall et al. | |
| 2007/0291711 A1 * | 12/2007 | Welch et al. | 370/338 |
| 2008/0005108 A1 * | 1/2008 | Ozzie et al. | 707/7 |
| 2008/0008165 A1 | 1/2008 | Ikeda et al. | |
| 2008/0039102 A1 | 2/2008 | Sewall et al. | |
| 2008/0043626 A1 | 2/2008 | Pham et al. | |
| 2008/0043673 A1 | 2/2008 | Johnson et al. | |
| 2008/0046561 A1 | 2/2008 | Pham et al. | |
| 2008/0049630 A1 * | 2/2008 | Kozisek et al. | 370/250 |
| 2008/0056222 A1 | 3/2008 | Waites | |
| 2008/0117860 A1 | 5/2008 | Rodriguez et al. | |
| 2008/0159167 A1 * | 7/2008 | Ito et al. | 370/252 |
| 2008/0178172 A1 | 7/2008 | Dossa et al. | |
| 2008/0250478 A1 | 10/2008 | Miller et al. | |
| 2008/0259841 A1 | 10/2008 | Deshpande | |
| 2008/0267195 A1 | 10/2008 | Belmon | |
| 2008/0310407 A1 | 12/2008 | Sewall et al. | |
| 2009/0007096 A1 | 1/2009 | Chavez et al. | |
| 2009/0015419 A1 | 1/2009 | Sewall et al. | |
| 2009/0109959 A1 | 4/2009 | Elliott et al. | |
| 2009/0129319 A1 | 5/2009 | Buddhikot et al. | |
| 2009/0138447 A1 * | 5/2009 | Kalavade | 707/3 |
| 2009/0141695 A1 * | 6/2009 | Karaoguz et al. | 370/338 |
| 2009/0147700 A1 | 6/2009 | Sewall et al. | |
| 2009/0168789 A1 | 7/2009 | Wood et al. | |
| 2009/0172658 A1 | 7/2009 | Wood et al. | |
| 2009/0172796 A1 | 7/2009 | Wood et al. | |
| 2009/0175285 A1 | 7/2009 | Wood et al. | |
| 2009/0180395 A1 | 7/2009 | Wood et al. | |
| 2009/0182845 A1 | 7/2009 | Johnson | |
| 2009/0207003 A1 | 8/2009 | Brekke et al. | |
| 2010/0014415 A1 | 1/2010 | Moeller | |
| 2010/0118846 A1 | 5/2010 | Moeller | |
| 2010/0202450 A1 | 8/2010 | Ansari et al. | |
| 2010/0231790 A1 | 9/2010 | Ansari et al. | |
| 2011/0051703 A1 | 3/2011 | Fulknier et al. | |
| 2011/0167157 A1 | 7/2011 | Virgilio et al. | |
| 2011/0199932 A1 | 8/2011 | Short et al. | |

OTHER PUBLICATIONS

Dar-Tzen Peng; Shin, K.G.; Abdelzaher, T.F.; , "Assignment and scheduling communicating periodic tasks in distributed real-time (56) References Cited

OTHER PUBLICATIONS time systems," Software Engineering, IEEE Transactions on, vol. 23, No. 12, pp. 745-758, Dec. 1997.*
MikroTik. "MikroTik RouterOS™ V28." 2005.*
International Search Report & Written Opinion of the International Searching Authority for Application No. PCT/US07/62079, mailed Nov. 8, 2007.
International Search Report & Written Opinion of the International Searching Authority for Application No. PCT/US07/62077, mailed Nov. 20, 2007.
International Search Report & Written Opinion of the International Searching Authority for Application No. PCT/US07/62078, mailed Mar. 5, 2007.
USPTO, "Final Office Action in U.S. Appl. No. 10/936,124.", Feb. 2, 2007.
USPTO, "Final Office Action in U.S. App. No. 10/936,124.", Feb. 9, 2009.
USPTO, "Final Office Action in U.S. Appl. No. 10/936,124.", Jul. 11, 2007.
USPTO, "Final Office Action in U.S. Appl. No. 10/936,124.", Sep. 3, 2009.
USPTO, "Office Action in U.S. Appl. No. 10/936,124.", Apr. 10, 2008.
USPTO, "Office Action in U.S. Appl. No. 10/936,124.", Jun. 26, 2006.
Webster's, "Router", Aug. 28, 2009, Publisher: Webster's New World Telcom Dictionary 2009, Your Dictionary, www.yourdictionary.com/telecom/router.
USPTO, "Final Office Action in U.S. Appl. No. 11/673,965.", Apr. 1, 2010.
USPTO, "Office Action in U.S. Appl. No. 11/673,965.", Sep. 2, 2009.
USPTO, "Advisory Action in U.S. Appl. No. 11/376,973", Mar. 19, 2010.
P. Vixie, S. Thomson, Y. Rekhter, J. Bound, "RFC 2136 Dynamic Updates in the Domain Name System (DNS Update), Internet Engineering Task Force, 51 pages.", Apr. 1997.
USPTO, "Final Office Action in U.S. Appl. No. 11/673,973.", Dec. 10, 2009.
USPTO, "Office Action in U.S. Appl. No. 11/673,973.", May 28, 2009.
Wikipedia, "Proxy Server, http://en.wikipedia.org/wiki/Proxy_server; 9 pages,", Apr. 12, 2010.
USPTO, "Final Office Action in U.S. Appl. No. 11/673,956.", Apr. 15, 2010.
USPTO, "Office Action in U.S. App. No. 11/673,956.", Sep. 2, 2009.
USPTO, "Office Action in U.S. Appl. No. 12/350,407.", Apr. 5, 2010.
PCT, "International Search Report and Written Opinion of the International Searching Authority for Application No. PCT/US2008/076836,", Mar. 6, 2009.
PCT, "International Search Report and Written Opinion of the International Searching Authority for Application No. PCT/US2008/083409,", May 12, 2009.
USPTO, "Office Action in U.S. Appl. No. 11/673,973", Jun. 24, 2010.
USPTO, "Office Action in U.S. Appl. No. 12/172,862", Aug. 31, 2010.
USPTO, "Office Action in U.S. Appl. No. 11/673,965 dated Feb. 15, 2011".
USPTO, "Office Action in U.S. Appl. No. 12/172,862 dated Feb. 14, 2011".
US Patent and Trademark Office, Office Action, U.S. Appl. No. 12/172,862, dated Jul. 27, 2011.
US Patent and Trademark Office, Final Office Action, U.S. Appl. No. 11/673.965, dated Aug. 4, 2011.
US Patent and Trademark Office, Office Action, U.S. Appl. No. 11/673,956, dated Aug. 10, 2011.
US Patent and Trademark Office, Office Action, U.S. Appl. No. 12/350,407, dated Jul. 6, 2011.
US Patent and Trademark Office, Final Office Action, U.S. Appl. No. 12/270,419, dated Jul. 11, 2011.
US Patent and Trademark Office, Office Action, U.S. Appl. No. 12/350,405, dated Feb. 16, 2012.
US Patent and Trademark Office, Final Office Action dated Mar. 15, 2012 for U.S. Appl. No. 12/843,541.
US Patent and Trademark Office, Office Action, U.S. Appl. No. 12/350,402, dated Apr. 16, 2012.
Router; http://www.yourdictionary.com/telecom/router; Aug. 28, 2009.
US Patent and Trademark Office, Office Action for U.S. Appl. No. 12/843,541 dated Jul. 18, 2012.
US Patent and Trademark Office, Final Office Action for U.S. Appl. No. 12/172,862 dated Apr. 24, 2012.
US Patent and Trademark Office; Office Action for U.S. Appl. No. 12/270,419 dated Mar. 27, 2012.
US Patent and Trademark Office, Final Office Action for U.S. Appl. No. 12/350,407 dated Jan. 3, 2012.
US Patent and Trademark Office, Office Action for U.S. Appl. No. 12/351,502 dated Apr. 25, 2012.
USPTO, "Office Action in U.S. Appl. No. 11/673,956 dated Dec. 22, 2010".
USPTO, "Office Action in U.S. Appl. No. 12/270,419 dated Dec. 17, 2010".
USPTO, "Final Office Action in U.S. Appl. No. 12/350,407 dated Dec. 14, 2010".
Office Action dated Aug. 20, 2012 in U.S. Appl. No. 12/172,862.
Office Action Dated Aug. 21, 2012 for U.S. Appl. No. 12/350,407.
Office Action Dated Sep. 12, 2012 for U.S. Appl. No. 12/350,460.
Office Action dated Mar. 14, 2013 in U.S. Appl. No. 12/172,862.
Final Office Action dated Apr. 10, 2013 issued in U.S. Appl. No. 12/351,502.
Office Action Dated Apr. 24, 2013 for U.S. Appl. No. 12/350,407.
Office Action dated Sep. 24, 2014, issued in CA 2730483.
Office Action dated Sep. 23, 2014, issued in CA 2730490.

* cited by examiner

SYSTEM AND METHOD FOR COLLECTING INDIVIDUALIZED NETWORK USAGE DATA IN A PERSONAL HOTSPOT WIRELESS NETWORK

CROSS REFERENCE TO RELATED APPLICATIONS

This application claims the priority of provisional applications 60/950,629 entitled "Data Collection System in a Network Environment" filed Jul. 19, 2007 which is hereby incorporated by reference. This application is also a continuation in part of application Ser. No. 11/673,956 entitled "Hotspot Communication Limiter" filed Feb. 12, 2007 which is incorporated herein by reference.

BACKGROUND

A personal hotspot acts as a wireless router device enabling multiple devices to connect to the internet via a cellular telephone or other cellular data connection. The bandwidth available for cellular data communications is limited. As a consequence, cellular data service providers are concerned about the network traffic generated when multiple users connect using a single data plan. To improve resource allocation, cellular data service providers benefit from learning the usage patterns of their individual customers. However the providers are only able to collect limited information on their own.

Internet traffic is includes data streams with each stream passing from an originating node, through any number of intermediary nodes, and on to destination node. Each data stream is broken into individual data packets that include a header describing network routing information and a payload containing the data to be delivered. Because, the cellular data service provider serves as an intermediary node, it would be required to open packets originating from or directed to a potentially vast multitude of customers in order to learn more about each individual customer's usage patterns. The goal of the provider is to quickly and efficiently move data, so inspecting packets at an intermediary node is impractical. Moreover, routers and other edge-of-network devices aggregate data from multiple customers and pass packets into the network which cannot be traced back to individual customers. As a consequence, cellular data service providers are uninformed of individual customer usage patterns.

DETAILED DESCRIPTION

Introduction:

Embodiments of the present invention allow a data service provider to collect individualized usage information from multiple users accessing the Internet via a single data plan. The provider can then aggregate the data received with respect to multiple data plans. Where the data plans are provided by a cellular data service provider, that provider can analyze the usage information received from multiple customers to more efficiently allocate resources in a limited bandwidth environment.

Figure 1:
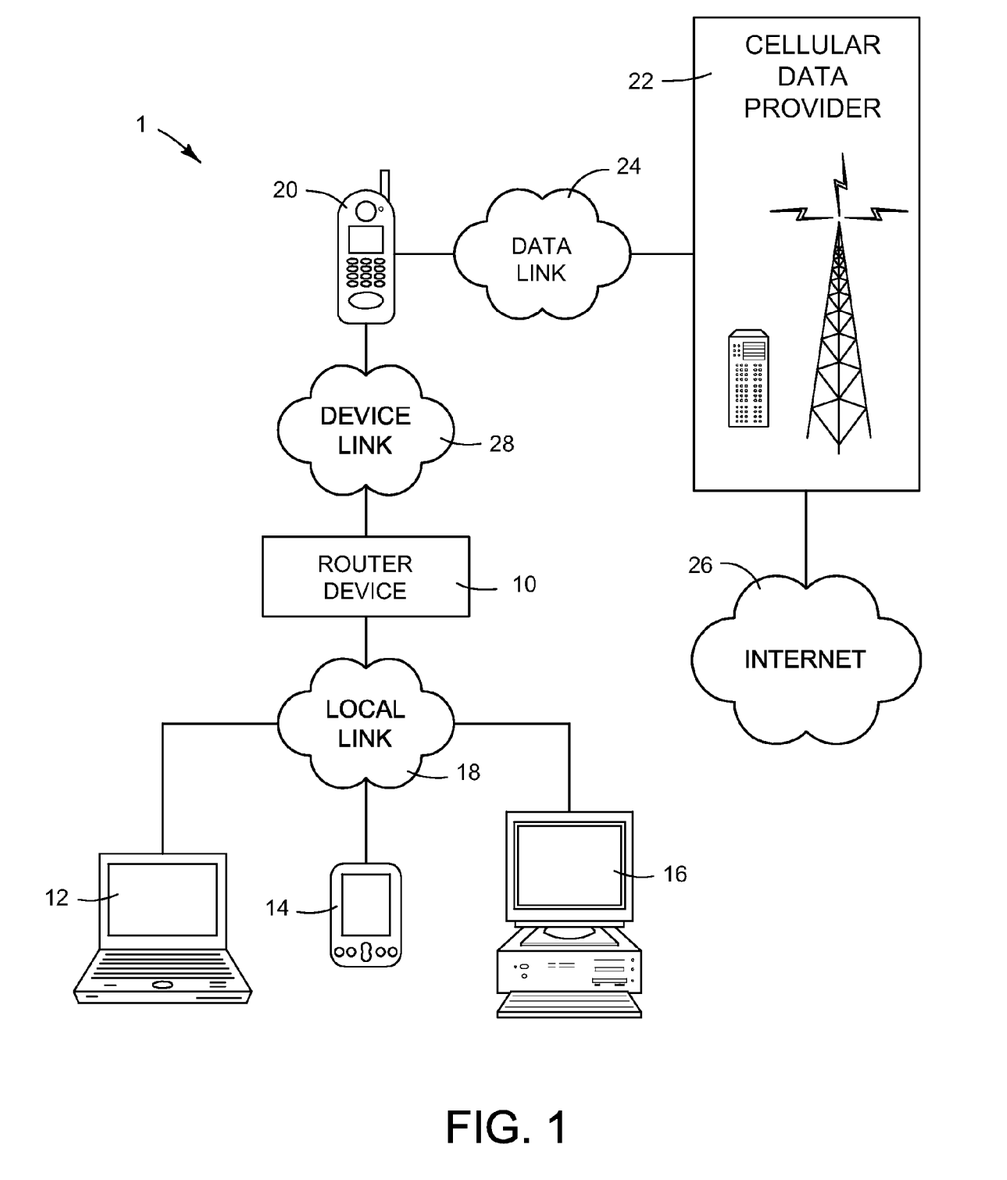
FIGS. 1 and 2 illustrate an exemplary block diagrams of environments in which embodiments of the present invention may be implemented.

Environment:

FIG. 1 illustrates exemplary environment 1 in which various embodiments of the present invention may be implemented. Environment 1 includes router device 10 and clients 12, 14, and 16 and local link 18. Router device 10, discussed in more detail later, represents generally a device capable or routing network communications between clients 12, 14, and 16 and internet 26 via a data exchanger 20. In an embodiment, router device 10 can be a personal hotspot. Clients 12, 14, and 16 represent generally any computing devices capable of communicating with router device 10.

Local link 18 interconnects router device 10 and clients 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchanger 20 and service provider 22. Data exchanger 20 represents generally any combination of hardware and/or programming that can be utilized by router device 10 to connect to a remote network such as the internet. While illustrated as an internet enabled cellular telephone, data exchanger 20 is not so limited. For example, data exchanger 20 may be a PCMCIA card or other device capable of cellular data communication. Internet enabled cellular telephones and other devices that are capable of data communications over a cellular network are referred to herein as data capable cellular devices. Other examples for data exchanger 20 include but are not limited to DSL modems and cable modems.

Service provider 22 represents generally any infrastructure configured to provide internet related data services to subscribers such as an owner of data exchanger 20. For example, where data exchanger 20 is a data capable cellular devices, service provider 22 may be a cellular telephone service provider capable of providing voice and data services to subscribers allowing access to internet 26. Where data exchanger 22 is a DSL or cable modem, service provider 22 may be a more traditional internet service provider (ISP) providing data access to internet 26.

Data link 24 serves as a common communications link through which communications are routed between internet 26 and clients 12, 14, and 16. Data link 24 interconnects data exchanger 20 and service provider 22 and represents generally any combination of a cable, wireless, or remote connection via a telecommunication link, an infrared link, a radio frequency link, or any other connector or system that provides electronic communication between data exchanger 20 and service provider 22.

In the embodiment illustrated in environment 1, device link 28 interconnects router device 10 and data exchanger 20. Device link 28 represents generally any combination of a cable, wireless, or remote connection via a telecommunication link, an infrared link, a radio frequency link, or any other connector or system that provides electronic communication between devices 10 and 20. As examples, device link 28 may incorporate a physical USB™ cable or radio waves carrying BLUETOOTH® communications.

Communication between clients 12, 14, and 16 and internet 26 is dependent upon router device 10. Router device 10, as discussed below with respect to FIGS. 3-6, includes components capable of collecting individualized usage information from clients 12, 14, and 16 accessing the Internet via data link 24 using a data plan assigned to data exchanger 20. Router device 10 is also capable of communicating the usage information to an interested server in the internet 26.

Figure 2:
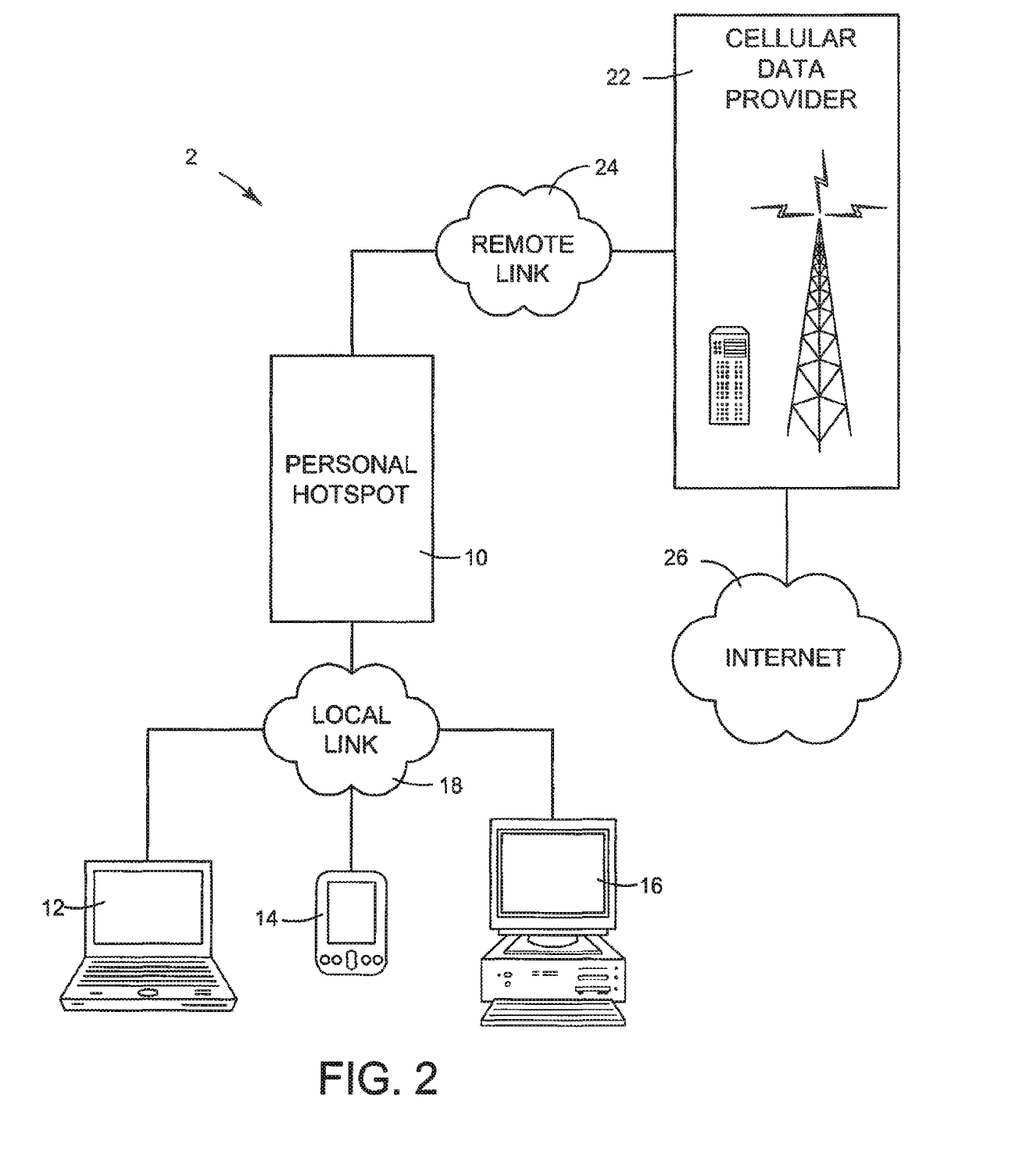

FIG. 2 illustrates another exemplary environment 2 in which various embodiments of the present invention may be implemented. In the example of FIG. 2, data exchanger 20 (not shown) and router device 10 are incorporated within the same device. Device link 32 (shown in FIG. 1) is eliminated and replaced with internal connections. In such a scenario, data exchanger may take the form of a PCMCIA card or any other device that can be inserter into a slot or otherwise coupled to router device 10. Alternatively, data exchanger 20 may be fully integrated into router device 10. As shown in FIG. 2, router device 10 can be a personal hotspot.

Figure 3:
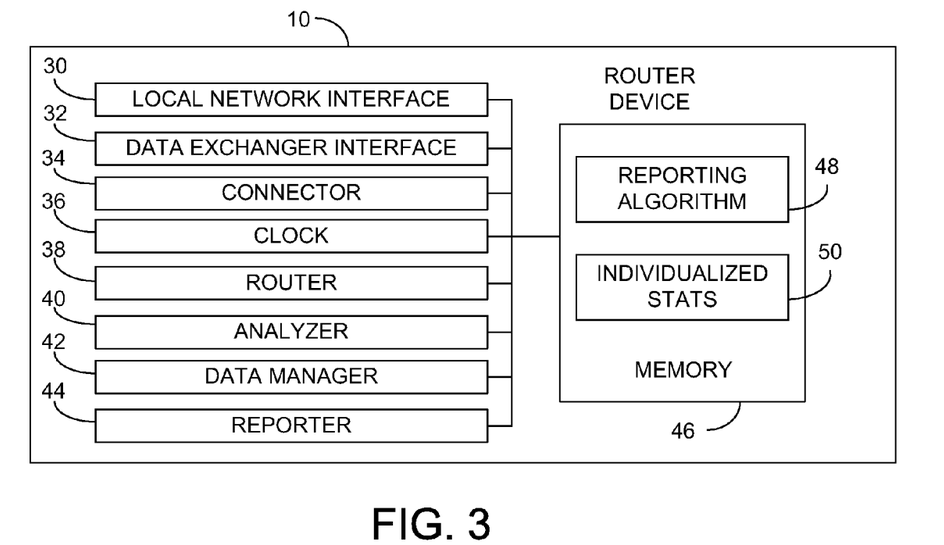
FIGS. 3-6 are block diagrams showing physical and logical components of a router device according to an embodiment of the present invention.

Router Device:

FIG. 3 is a block diagram illustrating physical and logical components of router device 10. As described above, router device 10 represents generally any combination of hardware and/or programming capable functioning as a router for directing network communications between clients and the internet via a data exchanger such as a data capable cellular device, DSL modem, or cable modem.

In the example of FIG. 3 router device 10 includes local network interface 30 and data exchanger interface 32. Local network interface 30 represents generally any combination of hardware and/or program instructions capable of supplying a communication interface between router device 10 and clients 12, 14, and 16 shown in FIGS. 1 and 2. Data exchanger interface 32 represents any combination of hardware and/or programming enabling data to be communicated between router device 10 and a data exchanger 20 shown in FIG. 1. For example, interfaces 30 and 32 may include a transceiver operable to exchange network communications utilizing a wireless protocol such as ultrawideband (UWB), BLUETOOTH®, or 802.11. Alternatively, interfaces 30 and 32 may include physical ports or other physical connection points enabling wired communication.

Router device 10 also includes connector 34, router 36, clock 38, analyzer 40, data manager 42, and reporter 44. Connector 34 represents generally any combination of hardware and/or programming for sending a signal to data exchanger 20 to establish a data connection with service provider 22 so that access can be made to internet 26. For example, where a data exchanger 20 is a data capable cellular device, connector 34 may send a signal causing the data capable cellular device to establish such a data link with service provider 22.

Router 38 represents generally any combination of hardware and/or programming for routing network communication received through network interface 30 to be transmitted by data exchanger 20 to internet 26. Router 36 is also responsible for routing inbound network communications received from internet 26 and directed via network interface 30 to a specified client 12, 14, or 16. Outbound and inbound network communications, for example can be an IP (internet Protocol) packets directed to a target on internet 26 or to a particular network device 12, 14, or 16 on a local area network.

Clock 36 represents generally and combination of hardware and programming capable of being used to correlate an event with a time. As examples, clock 38 may maintain time locally on router device 10 or it may communicate with a time service on internet 26.

Analyzer 40 represents generally any combination of hardware and programming for, monitoring individual communication characteristics for each client 12, 14, and 16 that utilizes router device 10. In other words, for each client 12, 14, and 16, analyzer 40 examines data being routed to and from that client. For example, data can be routed in packets. Each routed packet includes a header and a payload. The payload contains the data being routed. Among other information, the header contains data identifying the client 12, 14 or 16 from which or to which the packet is routed. In cases where packets are not of fixed sizes, the header can also identify a packet length or size. The header also identifies the type application from or to which the packet is being routed. Such an identifier can take the form of a port number. Different applications utilize different ports. The port used by a peer-to-peer application is different than the port used by a web browser application which is different than the port used by an e-mail application.

By examining the packet headers, analyzer 40 can discern a multitude of characteristics regarding the information being routed by router device 10. Such characteristics can identify the clients, throughput information, timing information, and the port numbers utilized by the clients. Throughput information identifies the amount of data routed to and from a client. Timing information correlates a particular event with a time. Using clock 38, analyzer can examine packet headers and identify when certain ports are being used. The timing information can also be used to identify a rate at which data is being routed to and from each client.

Data manager 42 represents generally any combination of hardware and programming for maintaining a collection of statistics reflecting, for each client, the characteristics monitored by analyzer 40. The statistics, for example, can, for each client, be reflective of the monitored open port numbers which correspond to the types of applications executed by that client to utilize the data link 24 to access internet 26. The statistics can, based on the timing information, be reflective of a schedule of access to internet 26. Such a schedule can indicate a duration or duration that a particular client access internet 26. The schedule may also indicate a duration for which each port number is opened by a given client. The statistics can, based on the throughput information, be reflective of the mount or quantity of data routed with respect that client and with respect to each port number opened by that client. Based on the timing information and the throughput information, the statistics can be reflective of a rate at which data is routed with respect to that client and to each port number opened by that client.

Reporter 44 represents generally any combination of hardware and programming for communicating, via router 36, the collection of statistics over data link 24 to an interested server on internet 26. Such periodic communications may be made in response to a request received from the interested server. Reporter 44 may utilize an algorithm defining when the communications are to be made. In certain cases, that algorithm may be altered based on communications received from the interested server. The algorithm may also be located remote from but accessible to reporter 44. For example the algorithm may be maintained in an accessible location on internet 26. In this manner, the algorithm can be updated remotely.

Still referring to FIG. 3, router device 10 also includes memory 46 which represents generally any memory capable of storing reporting algorithm 48 and individualized statistics 50. Reporting algorithm 48 represents an algorithm utilized by reporter 44 to determine when to communicate individualized statistics 50 to the interested server on internet 26. It is noted that reporting algorithm 48 need not be located on router device 10. Reporting algorithm 48 may be found on internet 26 in a location accessible to router device 10. Individualized statistics 50 represent the statistics maintained by data manager 42.

Figure 4:
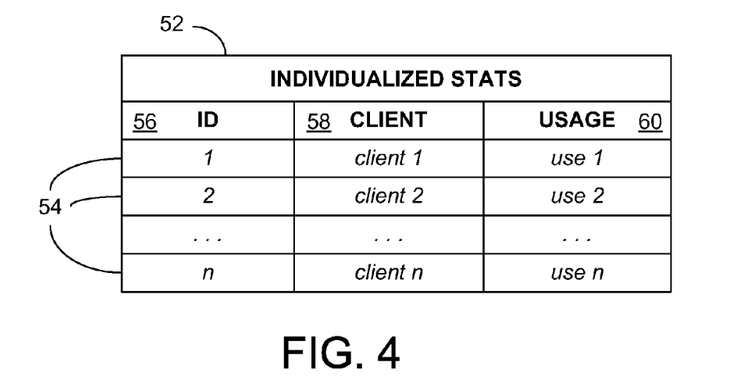

FIG. 4 provides an example of table 52 that may be maintained by data manager 42 as individualized statistics 50 in memory 48. Table 52 includes entries 54. Each entry 54 includes data in ID field 56, client field 58, and usage field 60. Each entry 54 corresponds to a unique client that is utilizing router device 10 to access internet 26. Data in ID field 56 is used to uniquely identify the entry 54 in table 52. Data in client field 58 is used to identify a particular client. In other words, each client utilizing router device 10 will have its own entry 54. The identifying data may be a local IP address or a physical address for the client. Data in usage field 60 represents the collection of statistics reflecting the monitored characteristics of a given client's communications routed over data link 24.

Figure 5:
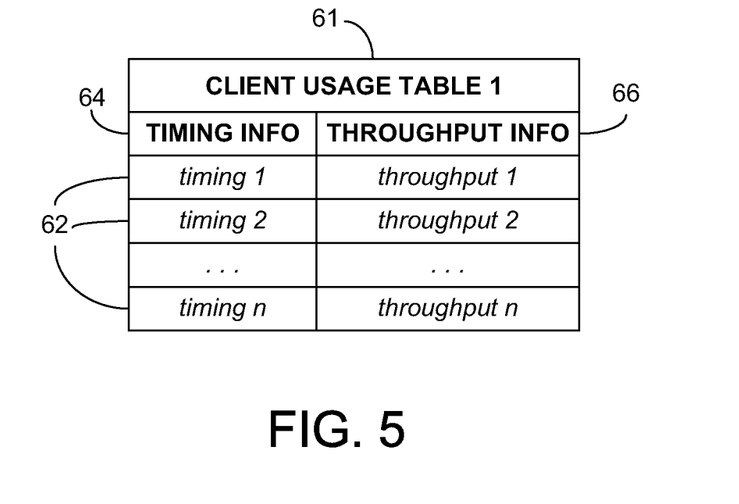

Data in usage field 60 of a given entry 54 can take any of a number of forms. In FIG. 5, the usage data is in the form of a client usage table 61. Referring back to FIG. 4, a client usage table 61 would exist for each entry 54 in table 52 with each table 61 being unique to a particular client. Table 61 is shown to include entries 62, each corresponding to a monitored use of router device 10 by a given client. Each entry 62 contains data in a timing info field 64 and in a throughput info field 66. Data in timing field 64 represents timing information for the monitored use. The timing information may indicate a start time and a duration or a start time and an end time. Data in throughput info field 66 represents throughput information. The throughput information may indicate an amount of data routed during the monitored use. Based on the timing information and the throughput information, one can determine an average rate at which data was routed during the monitored use.

Figure 6:
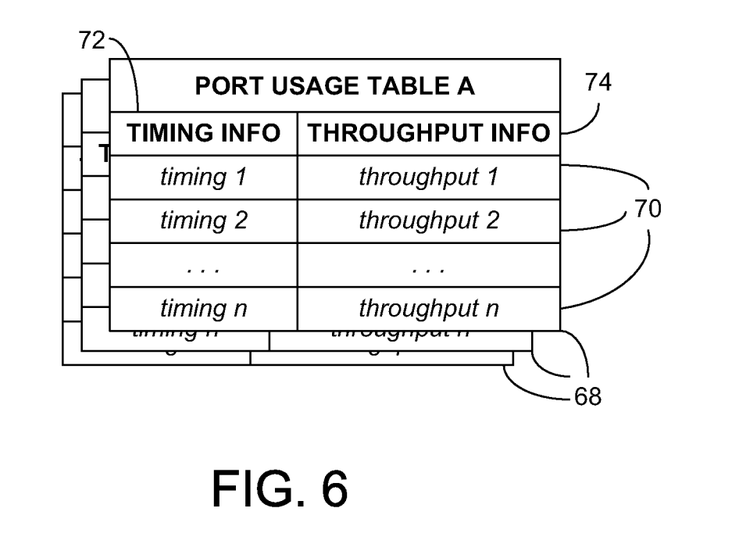

Referring to FIGS. 4 and 6, data in usage field 60 of a given entry 54 could also or instead take the form of a series of port usage tables 68. A different series of port usage tables 68 would exist for each entry 54 in table 52 with each different series of tables 68 being unique to a particular client. Each port usage table 68 corresponds to a particular port number opened by a given client. Each port usage table 68 includes entries 70 containing data in a timing info field 72 and in a throughput info field 74. Data in timing field 72 represents timing information for the monitored use for the particular port number. The timing information may indicate a start time and a duration or a start time and an end time. Data in throughput info field 74 represents throughput information for the given port number. The throughput information may indicate an amount of data routed during the monitored use. Based on the timing information and the throughput information, one can determine an average rate at which data was routed during the monitored use.

Figure 7:
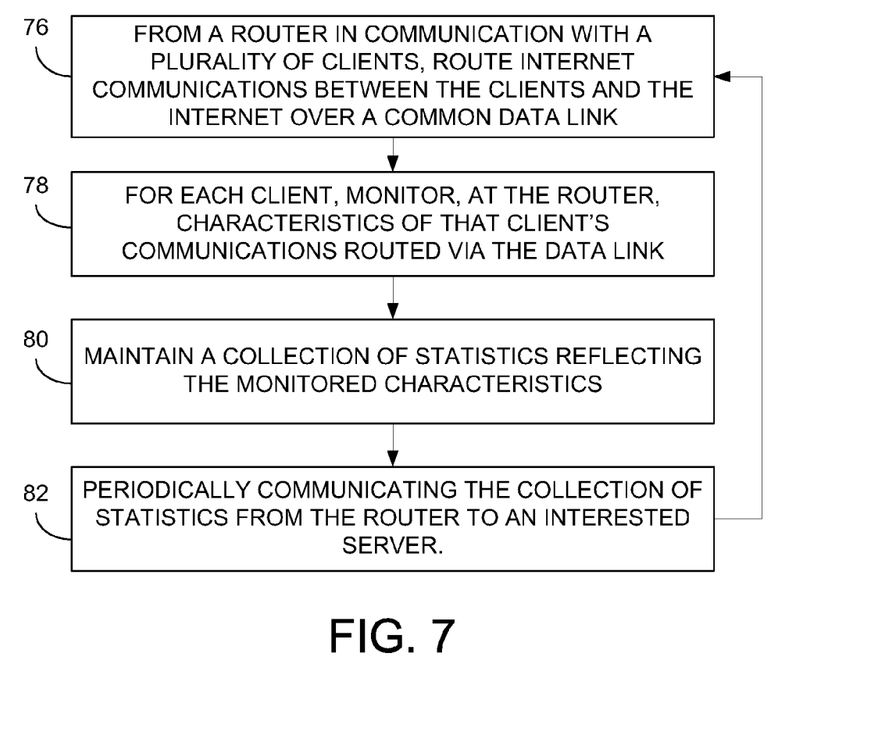
FIG. 7 is an exemplary flow diagram illustrating steps taken in performance of various embodiments of the present invention.

Operation:

FIG. 7 is an exemplary flow diagram illustrating steps taken in performance of various embodiments. From a router device placed in communication with a plurality of clients, communications are routed between the plurality of clients and the internet over a common data link (step 76). Referring to FIG. 3, for example, step 76 may be accomplished using router 36 of router device 10.

For each of the plurality of clients, characteristics of that client's communications routed via the data link are monitored (step 78). Step 78 may be performed by analyzer 40 in the example of FIG. 3. Such characteristics can include opened port numbers, timing information, and throughput information. As explained, packets being routed can identify the client to or from which the packets is routed. The packet can also identify a corresponding port number as well as a size. Different port numbers are associated with different application types. Using information from the packets, the different types of application used by each client, a schedule of use, and an amount of data transferred can be determined.

A collection of statistics reflecting the monitored characteristics are maintained for each of the plurality of clients (step 82). Again referring back to FIG. 3, Step 80 may be accomplished by data manager 42 of router device 10. Where the monitored characteristics include timing and throughput information, the collection of statistics can be, based upon the timing information, reflective of a schedule of when and a duration or durations a given client utilized the data connection to access the Internet. The statistics may be, based upon the throughput information, be reflective of a quantity of data touted to or from a given client over the data connection. Using both the timing information and the throughput information, the statistics may be reflective of a rate at which data is routed to and from a particular client.

As explained the collection of statistics can, for each of the plurality of clients, be reflective of the port numbers opened by that client. Consequently, the statistics may be reflective of the types of applications opened by each given client. Further, the various statistics can be broken down by client and then by port number. The statistics may be reflective of a schedule of when each port number is opened by a given client. The statistics may be reflective of a duration each port number is opened and a quantity of data routed with respect to each port number. Moreover, the statistics may reflect the rate at which data is routed with respect to each port number.

The collection of statistics are then periodically communicated to an interested server on the internet (step 82). Referring to FIG. 3, step 82 may be performed by router 44. Step 82 may be performed in response to a request from the interested server. Step 82 may be performed according to an algorithm that defines when communications are to be made. Moreover, that algorithm may be altered by a communication received from the interested server. For example, the algorithm may indicate that the statistics are to be communicated once a week to the interested server. The interested server may later desire to alter the algorithm to cause the communications to be sent once a month, twice a week, or according to any other desired schedule.

CONCLUSION

The schematic diagrams of FIGS. 1 and 2 illustrate exemplary environments in which embodiments of the present invention may be implemented. Implementation, however, is not limited to these environments. The diagrams of FIGS. 3-6 show the architecture, functionality, and operation of various embodiments of the present invention. A number of the blocks are defined, at least in part, as programs or programming. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 7 shows specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for collecting individualized network usage data, comprising:
routing Internet communications between a plurality of local clients and a plurality of remote servers over a common data link between a router device and the Internet, wherein the router device is a personal hotspot that connects the plurality of local clients to the internet via a cellular data connection;
for each of the plurality of clients, monitoring, at the router device, characteristics of that client's communications, the characteristics including timing data for each of the plurality of clients, where the timing data includes either a communication start time and a duration time, or a communication start time and an end time, for each monitored client communication routed over the data link;
maintaining a collection of statistics reflecting the monitored characteristics for each of the plurality of clients;
from the router device, periodically communicating the collection of statistics over the data link to an interested server, wherein periodically communicating comprises periodically communicating to the interested server according to an algorithm defining a schedule; and
receiving a communication from the interested server that alters the algorithm defining a schedule.

2. The method of claim 1, wherein:
monitoring characteristics comprises monitoring, for each client, logical port numbers being opened by that client;
maintaining comprises maintaining, for each client, a collection of statistics that are reflective of the monitored open port numbers, each port number corresponding to a type of application utilizing the data link to access the internet.

3. The method of claim 1, wherein:
monitoring characteristics comprises monitoring, for each client, logical port numbers being opened by that client and one or more of timing information and data throughput information for each opened logical port number; and
maintaining comprises maintaining, for each client, a collection of statistics that are reflective of one or more of:
types of applications executed by that client to utilize the data link to access the Internet based upon the port numbers opened by that client;
a schedule of when each port number is opened based on the timing information;
a duration each port number is opened or a schedule of when each port is closed based on the timing information;
a quantity of data routed with respect to each port number based on the throughput information; and
a rate at which data is routed with respect to each port number based on the throughput information and the timing information.

4. The method of claim 3, wherein:
the timing information includes information indicating times when each port number is opened;
the throughput information includes information indicating the amount of data routed with respect to each port number.

5. The method of claim 1, wherein:
monitoring characteristics comprises monitoring, for each client, timing information and data throughput information; and
maintaining comprises maintaining, for each client, a collection of statistics that are reflective of one or more of:
a schedule of when that client utilized the data connection to access the Internet based on the timing information for that client;
a duration that the client utilized the data connection to access the internet based on the timing information;
a quantity of data routed to or from that client over the data connection based on the throughput information; and
a rate at which data is routed to or from that client based on the throughput information and the timing information.

6. The method of claim 5, wherein:
the timing information includes information indicating times when each client utilizes the data connection;
the throughput information includes information indicating the amount of data routed with respect to each client.

7. The method of claim 1, wherein periodically communicating comprises responding to a request from the interested server.

8. A non-transitory computer readable medium having computer executable instructions for:
routing Internet communications between a plurality of local clients and a plurality of remote servers over a common data link between a router device and the Internet, the router device being a personal hotspot that connects the plurality of local clients to the Internet via a cellular data connection;
for each of the plurality of clients, monitoring, at the router device, characteristics of that client's communications, the characteristics including timing data for each of the plurality of clients, where the timing data includes either a communication start time and a duration time, or a communication start time and an end time, for each monitored client communication routed over the data link;
maintaining a collection of statistics reflecting the monitored characteristics for each of the plurality of clients;
the router periodically communicating the collection of statistics from the router device over the data link to an interested server, wherein periodically communicating comprises periodically communicating to the interested server according to an algorithm defining a schedule; and receiving a communication from the interested server that alters the algorithm defining a schedule.

9. The medium of claim 8, wherein:

the instructions for monitoring characteristics include instructions for monitoring, for each client, logical port numbers being opened by that client;

the instructions for maintaining include instructions for maintaining, for each client, a collection of statistics that are reflective of the monitored open port numbers, each port number corresponding to a type of application utilizing the data link to access the internet.

10. The medium of claim 8, wherein:

the instructions for monitoring characteristics include instructions for monitoring, for each client, logical port numbers being opened by that client and one or more of timing information and data throughput information for each opened logical port number; and the instructions for maintaining include instructions for maintaining, for each client, a collection of statistics that are reflective of one or more of:

types of applications executed by that client to utilize the data link to access the Internet based upon the port numbers opened by that client;

a schedule of when each port number is opened based on the timing information;

a duration each port number is opened or a schedule of when each port is closed based on the timing information;

a quantity of data routed with respect to each port number based on the throughput information; and a rate at which data is routed with respect to each port number based on the throughput information and the timing information.

11. The medium of claim 10, wherein:

the timing information includes information indicating times when each port number is opened;

the throughput information includes information indicating the amount of data routed with respect to each port number.

12. The medium of claim 8, wherein:

the instructions for monitoring characteristics include instructions for monitoring, for each client, timing information and data throughput information; and the instructions for maintaining include instructions for maintaining, for each client, a collection of statistics that are reflective of one or more of:

a schedule of when that client utilized the data connection to access the Internet based on the timing information for that client;

a duration that the client utilized the data connection to access the internet based on the timing information;

a quantity of data routed to or from that client over the data connection based on the throughput information; and a rate at which data is routed to or from that client based on the throughput information and the timing information.

13. The medium of claim 12, wherein:

the timing information includes information indicating times when each client utilizes the data connection;

the throughput information includes information indicating the amount of data routed with respect to each client.

14. The medium of claim 8, wherein the instructions for periodically communicating include instructions for responding to a request from the interested server.

15. A personal hotspot device for routing communications between clients and the Internet comprising:

a router configured to route Internet communications between a plurality of local clients and a plurality of remote servers over a common data link between the router and the Internet;

an analyzer configured to, for each of the plurality of clients, monitor, at the router, characteristics of that client's communications, the characteristics including timing data for each of the plurality of clients, where the timing data includes either a communication start time and a duration, or a communication start time and an end time, for each monitored client communication routed over the data link;

a data manager configured to maintain a collection of statistics reflecting the monitored characteristics for each of the plurality of clients; and a reporter configured to periodically communicate, via the router, the collection of statistics over the data link to an interested server, wherein the reporter is configured to periodically communicate to the interested server according to an algorithm defining a schedule, and wherein the reporter is configured to receive via the router a communication from the interested server and to alter the algorithm defining a schedule according to the communication; and wherein the personal hotspot device is configured to connect the plurality of local clients to the internet via a cellular data connection.

16. The device of claim 15, wherein:

the monitor is configured to monitor, for each client, logical port numbers being opened by that client;

the data manager is configured to maintain, for each client, a collection of statistics that are reflective of the monitored open port numbers, each port number corresponding to a type of application utilizing the data link to access the internet.

17. The device of claim 15, wherein:

the monitor is configured to monitor, for each client, logical port numbers being opened by that client and one or more of timing information and data throughput information for each opened logical port number; and the data manager is configured to maintain, for each client, a collection of statistics that are reflective of one or more of:

types of applications executed by that client to utilize the data link to access the Internet based upon the port numbers opened by that client;

a schedule of when each port number is opened based on the timing information;

a duration each port number is opened or a schedule of when each port is closed based on the timing information;

a quantity of data routed with respect to each port number based on the throughput information; and a rate at which data is routed with respect to each port number based on the throughput information and the timing information.

18. The device of claim 17, wherein:

the timing information includes information indicating times when each port number is opened;

the throughput information includes information indicating the amount of data routed with respect to each port number.

19. The device of claim 15, wherein:

the monitor is configured to monitor, for each client, timing information and data throughput information; and the data manager is configured to maintain, for each client, a collection of statistics that are reflective of one or more of:

a schedule of when that client utilized the data connection to access the Internet based on the timing information for that client;

a duration that the client utilized the data connection to access the internet based on the timing information;

a quantity of data routed to or from that client over the data connection based on the throughput information; and     a rate at which data is routed to or from that client based on the throughput information and the timing information.

20. The device of claim 19, wherein:

the timing information includes information indicating times when each client utilizes the data connection;

the throughput information includes information indicating the amount of data routed with respect to each client.

21. The device of claim 15, the reporter is configured to periodically communicate by responding to a request from the interested server.

22. A personal hotspot device for routing communications between clients and the internet comprising:

means for providing a router configured to route Internet communications between a plurality of local clients and a plurality of remote servers over a common data link between the router and the Internet;

a means for connecting the plurality of local clients to the Internet via a cellular data connection;

means for, for each of the plurality of clients, monitoring, at the router, characteristics of that client's communications, the characteristics including timing data for each of the plurality of clients, where the timing data includes either a communication start time and a duration time, or a communication start time and an end time, for each monitored client communication routed over the data link;

means for maintaining a collection of statistics reflecting the monitored characteristics for each of the plurality of clients; and     means for periodically communicating the collection of statistics over the data link to an interested server wherein the means for periodically communicating are configured to periodically communicate to the interested server according to an algorithm defining a schedule, and wherein the means for periodically communicating are configured to receive via the router a communication from the interested server and to alter the algorithm defining a schedule according to the communication.

23. A method for collecting individualized network usage data, comprising:

routing Internet communications between a plurality of local clients and a plurality of remote servers over a common data link between a router device and the Internet, wherein the router device is a personal hotspot that connects the plurality of local clients to the internet via a cellular data connection;

for each of the plurality of clients, monitoring, at the router device, characteristics of that client's communications, the characteristics including logical port numbers being opened by that client and timing information and data throughput information for each opened logical port number, where the timing data includes at least a start time and a duration time, or a start time and an end time, for each client's monitored use of the port numbers during communications routed over the data link;

maintaining a collection of statistics on the router device reflecting the monitored characteristics for each of the plurality of clients, wherein the statistics are reflective of:

types of applications executed by that client to utilize the data link to access the Internet based upon the port numbers opened by that client;

a schedule of when each port number is opened based on the timing information;

a duration each port number is opened or a schedule of when each port number is closed based on the timing information;

a quantity of data routed with respect to each port number based on the throughput information; and         a rate at which data is routed with respect to each port number based on the throughput information and the timing information; and     from the router device, periodically communicating the collection of statistics over the data link to an interested server, wherein periodically communicating comprises periodically communicating to the interested server according to an algorithm defining a schedule; and     receiving a communication from the interested server that alters the algorithm defining a schedule.

\* \* \* \* \*